(12) United States Patent
Bialy

(10) Patent No.: US 11,845,577 B2
(45) Date of Patent: *Dec. 19, 2023

(54) CONVEYOR DEVICE FOR CONVEYING FOOD PRODUCTS

(71) Applicant: PROVISUR TECHNOLOGIES, INC., Chicago, IL (US)

(72) Inventor: Jürgen Bialy, Altenberge (DE)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,271

(22) Filed: Jan. 5, 2023

(65) Prior Publication Data

US 2023/0144765 A1 May 11, 2023

Related U.S. Application Data

(60) Continuation of application No. 17/645,562, filed on Dec. 22, 2021, now Pat. No. 11,554,887, which is a
(Continued)

(51) Int. Cl.
*B65B 35/44* (2006.01)
*B65B 25/06* (2006.01)
(Continued)

(52) U.S. Cl.
CPC .............. *B65B 35/44* (2013.01); *B65B 25/06* (2013.01); *B65B 25/065* (2013.01);
(Continued)

(58) Field of Classification Search
CPC ........ B65G 37/00; B65G 43/08; B65G 47/31; B65G 47/32; B65G 15/24; B65G 47/086;
(Continued)

(56) References Cited

U.S. PATENT DOCUMENTS 4,109,569 A   8/1978   Kemper
5,078,255 A   1/1992   Haley
(Continued)

FOREIGN PATENT DOCUMENTS

AT   41399 T    4/1989
DE   619 395 C  10/1935
(Continued)

OTHER PUBLICATIONS

European Search Report and Written Opinion in connection with European Patent Application No. EP 15 00 0291 dated May 27, 2015, 7 pages.

*Primary Examiner* — Mark A Deuble
(74) *Attorney, Agent, or Firm* — Klintworth & Rozenblat IP LLP

(57) ABSTRACT

A method of using a conveyor device is provided for conveying food products in stacks or interleaved units made of a plurality of slices of cheese or meat products. The method formats the food products in a specific product format on a plurality of parallel conveyor tracks, and fills a product gap on one of the plurality of parallel conveyor tracks incoming on the input side with a food product so that on the output side all parallel conveyor tracks are supplied with the food products.

18 Claims, 15 Drawing Sheets

Related U.S. Application Data division of application No. 17/062,893, filed on Oct. 5, 2020, now Pat. No. 11,225,347, which is a division of application No. 16/663,943, filed on Oct. 25, 2019, now Pat. No. 10,807,748.

(51) Int. Cl.

| | | |
|---|---|---|
| *B65B 35/30* | (2006.01) | |
| *B65B 35/54* | (2006.01) | |
| *B65G 47/08* | (2006.01) | |
| *B65G 15/24* | (2006.01) | |
| *B65G 37/00* | (2006.01) | |
| *B65G 43/08* | (2006.01) | |
| *B65G 47/31* | (2006.01) | |
| *B65G 47/32* | (2006.01) | |

(52) U.S. Cl.
CPC ............ *B65B 25/068* (2013.01); *B65B 35/30* (2013.01); *B65B 35/54* (2013.01); *B65G 15/24* (2013.01); *B65G 37/00* (2013.01); *B65G 43/08* (2013.01); *B65G 47/084* (2013.01); *B65G 47/086* (2013.01); *B65G 47/31* (2013.01); *B65G 47/32* (2013.01); *B65G 2201/0202* (2013.01); *Y10T 83/2192* (2015.04)

(58) Field of Classification Search
CPC ............ B65G 2201/0202; B65G 47/08; B65G 2201/02022; B65G 47/084; B65G 47/082; B65B 25/06; B65B 25/065; B65B 25/068; B65B 35/30; B65B 35/44; B65B 35/54; Y10T 83/2192; A22C 17/0093; A22C 17/0033

See application file for complete search history.

(56) References Cited

U.S. PATENT DOCUMENTS

| | | | |
|---|---|---|---|
| 5,499,719 | A | 3/1996 | Lindee et al. |
| 5,810,149 | A | 9/1998 | Sandberg et al. |
| 10,065,757 | B2 | 9/2018 | Bialy |
| 10,457,433 | B2 | 10/2019 | Bialy |
| 11,225,347 | B2 * | 1/2022 | Bialy ............... B65B 25/065 |
| 11,554,887 | B2 * | 1/2023 | Bialy ............... B65G 47/31 |
| 2003/0233918 | A1 | 12/2003 | Lindee et al. |
| 2004/0069156 | A1 | 4/2004 | Reed et al. |
| 2004/0159246 | A1 | 8/2004 | Weber |
| 2012/0042612 | A1 | 2/2012 | Weber |
| 2012/0042757 | A1 | 2/2012 | Weber |
| 2012/0198975 | A1 | 8/2012 | Lindee |
| 2013/0042579 | A1 | 2/2013 | Rother |
| 2013/0341254 | A1 | 12/2013 | Bauer et al. |
| 2020/0262659 | A1 | 8/2020 | Fox et al. |
| 2021/0100258 | A1 | 4/2021 | Nothum, Jr. et al. |

FOREIGN PATENT DOCUMENTS

| | | |
|---|---|---|
| DE | 680 07 416 U | 7/1970 |
| DE | 2032453 A1 | 1/1972 |
| DE | 2531967 A1 | 2/1976 |
| DE | 2 522 579 A | 12/1976 |
| DE | 270 8 131 A | 8/1978 |
| DE | 363 0 791 C | 10/1987 |
| DE | 689 07 213 T2 | 9/1993 |
| DE | 4413446 A1 | 10/1995 |
| DE | 196 17 187 A1 | 10/1997 |
| DE | 69605971 T2 | 6/2000 |
| DE | 699 08 370 T2 | 3/2004 |
| DE | 697 34146 T2 | 6/2006 |
| DE | 102007017035 A1 | 10/2008 |
| DE | 102007028680 A1 | 12/2008 |
| DE | 102010017497 A1 | 12/2011 |
| DE | 102011053009 A1 | 3/2012 |
| DE | 102011118062 A1 | 5/2013 |
| DE | 102012003500 A1 | 8/2013 |
| DE | 102012010845 A1 | 12/2013 |
| DE | 102012210703 A1 | 1/2014 |
| DE | 102014002530 A1 | 8/2015 |
| EP | 0826614 A2 | 3/1998 |
| EP | 1291305 A1 | 3/2003 |
| EP | 1331181 A1 | 7/2003 |
| EP | 1683746 A2 | 7/2006 |
| EP | 1792857 A1 | 6/2007 |
| EP | 2030898 A1 | 3/2009 |
| EP | 2 420 460 A1 | 2/2012 |
| EP | 2420363 A1 | 2/2012 |
| EP | 2657138 A2 | 10/2013 |
| EP | 2657182 A1 | 10/2013 |
| EP | 2 679 524 A1 | 1/2014 |
| EP | 2789538 A1 | 10/2014 |
| WO | 97/10165 A1 | 3/1997 |
| WO | 2005/123513 A1 | 12/2005 |

* cited by examiner

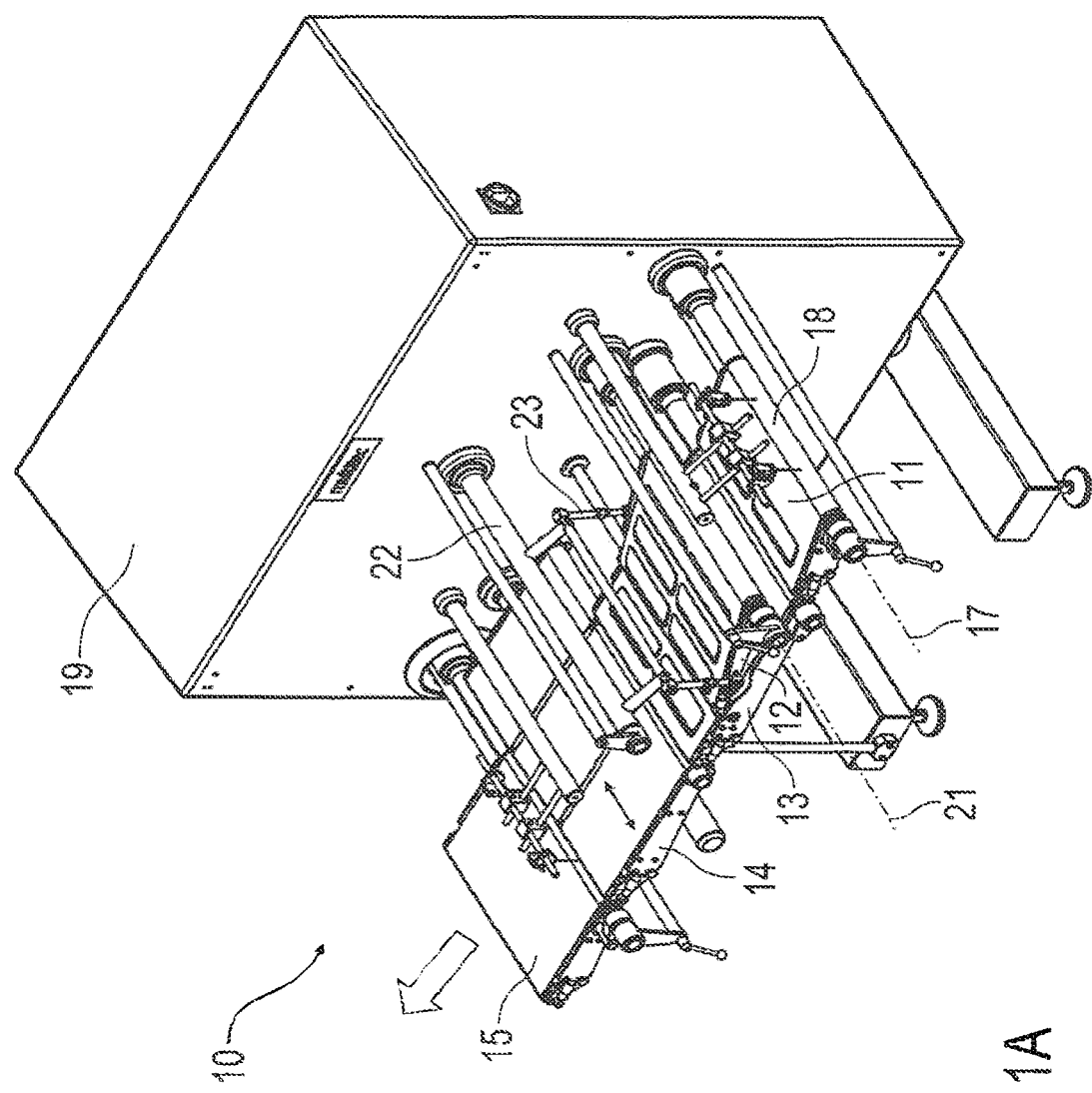

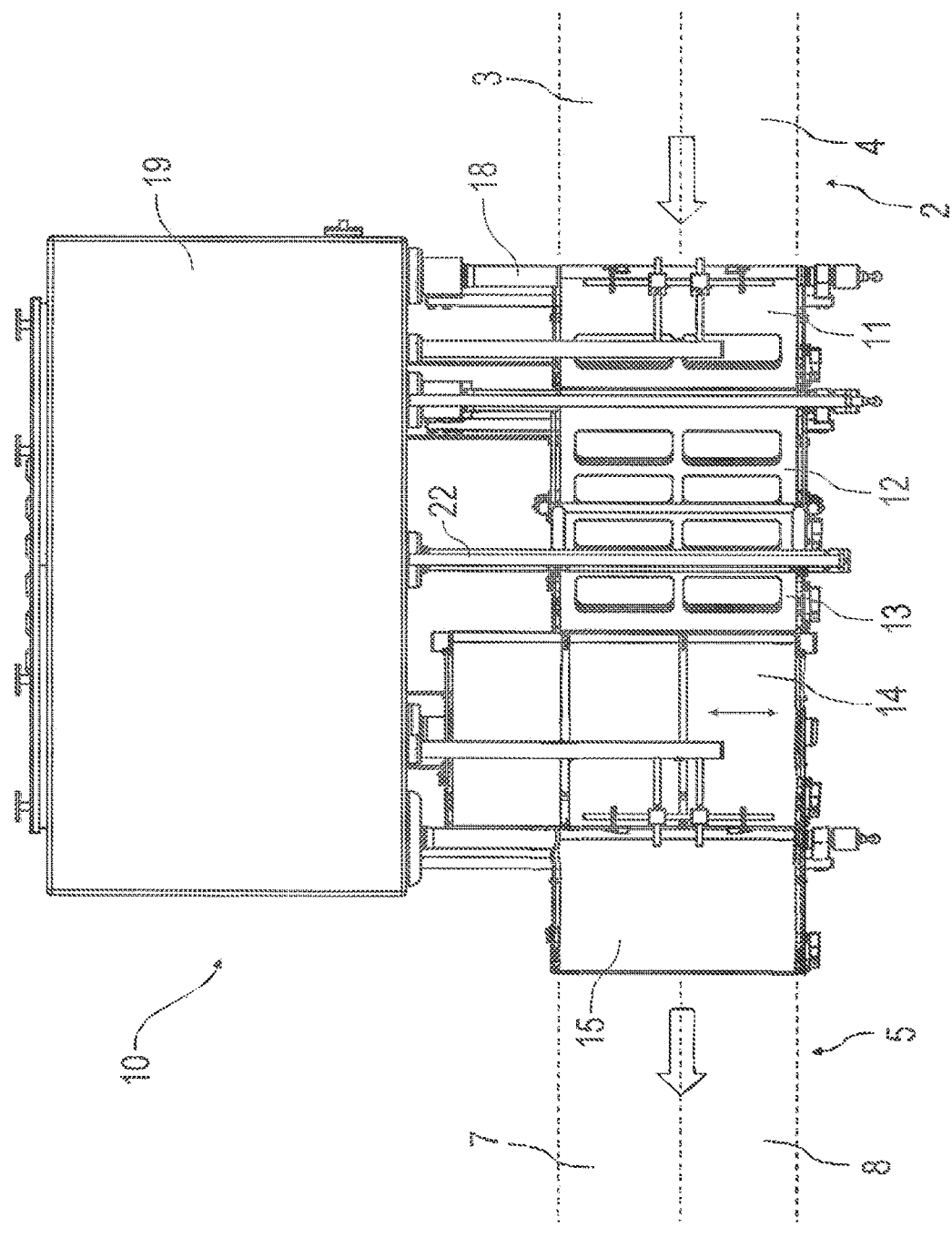

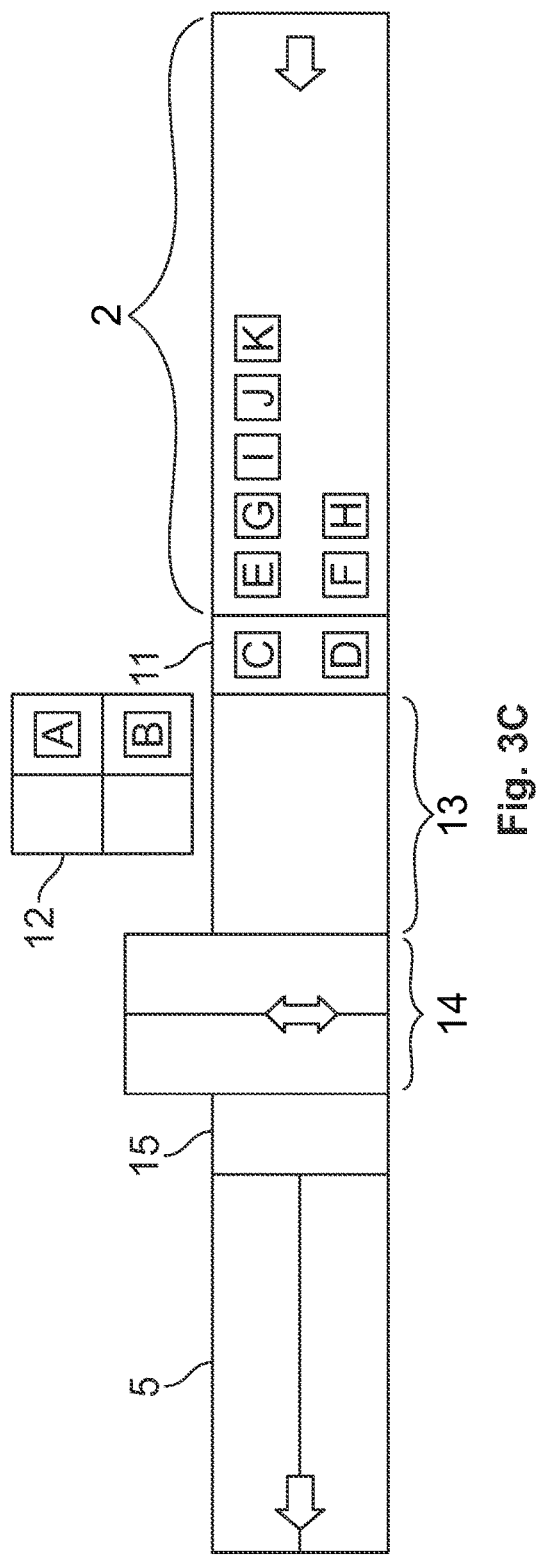
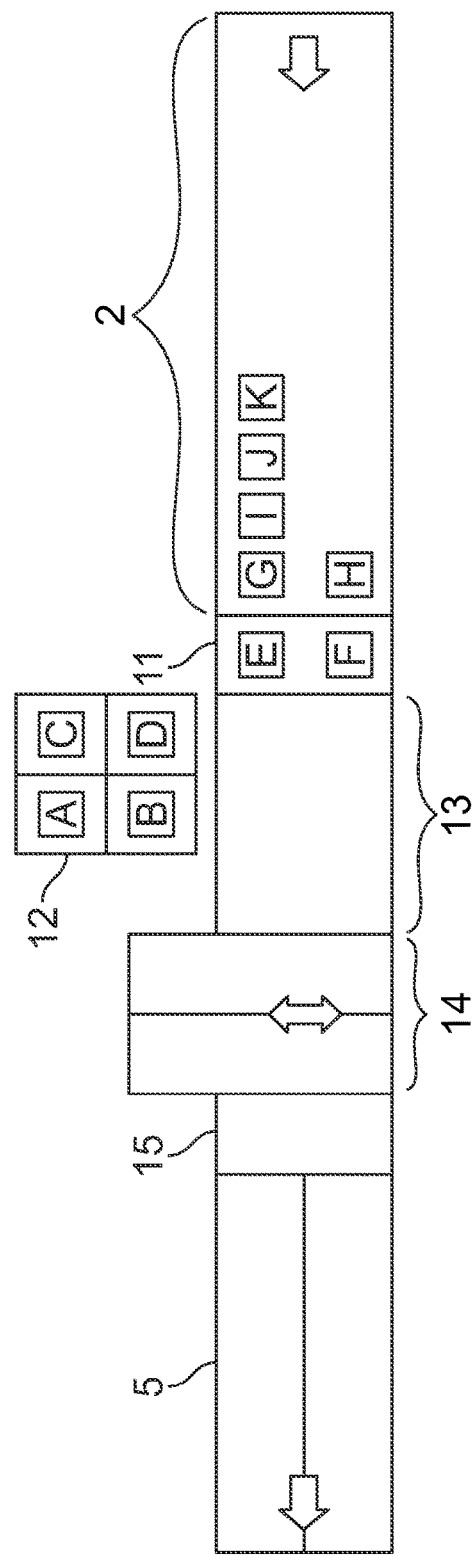

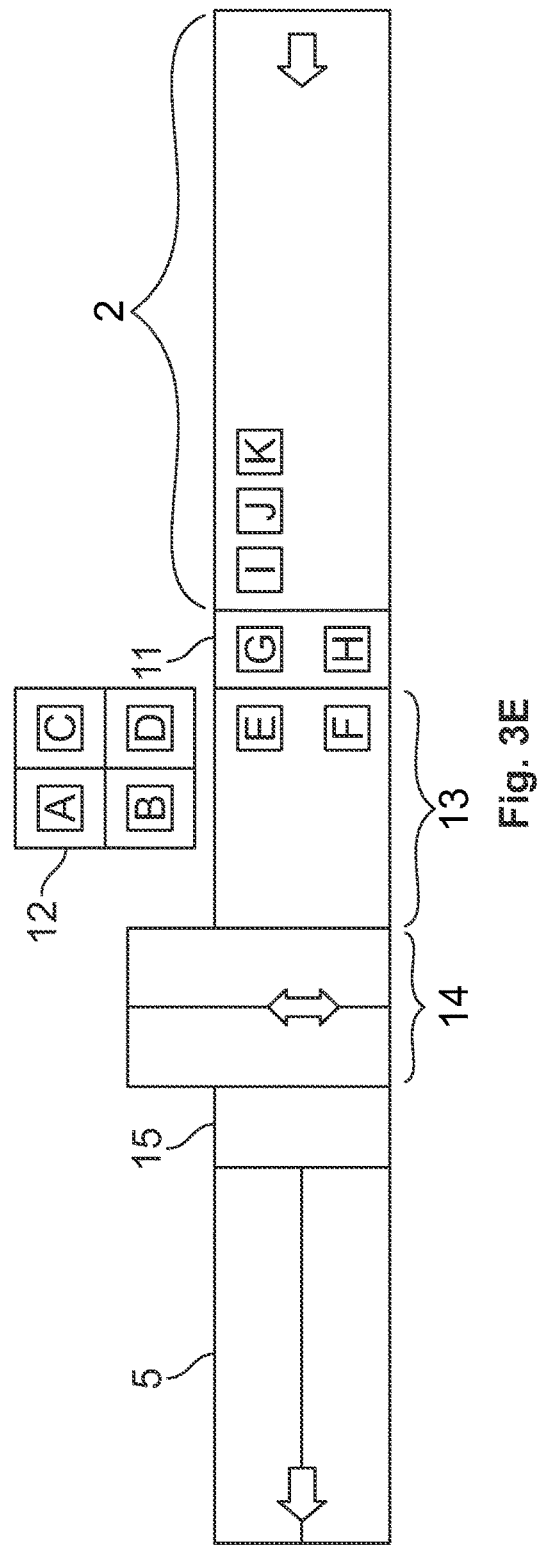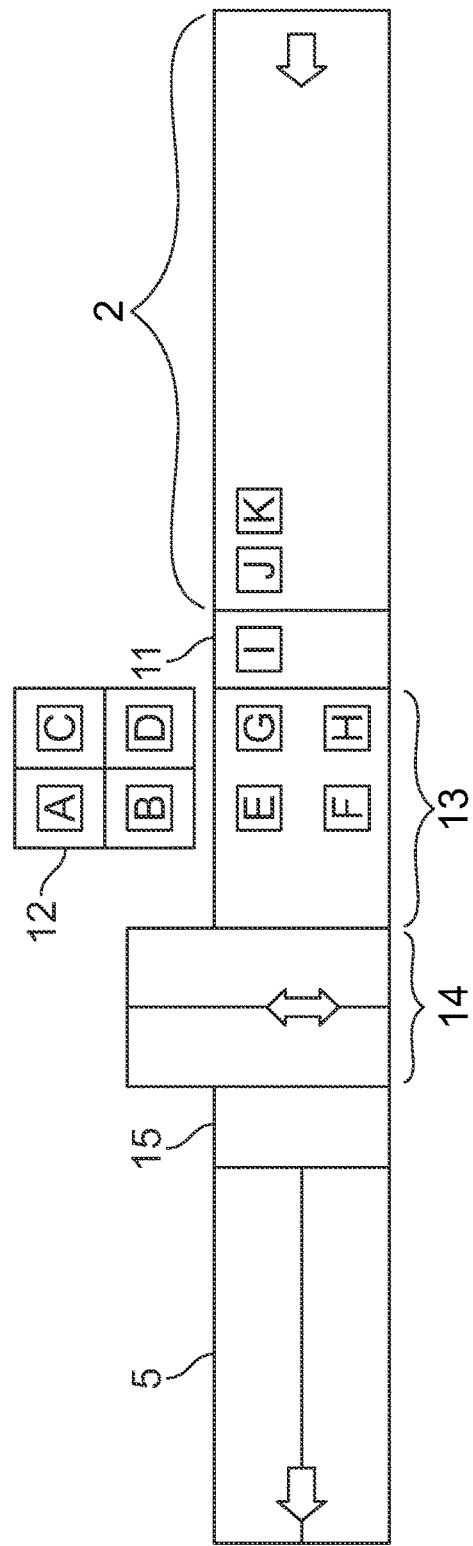

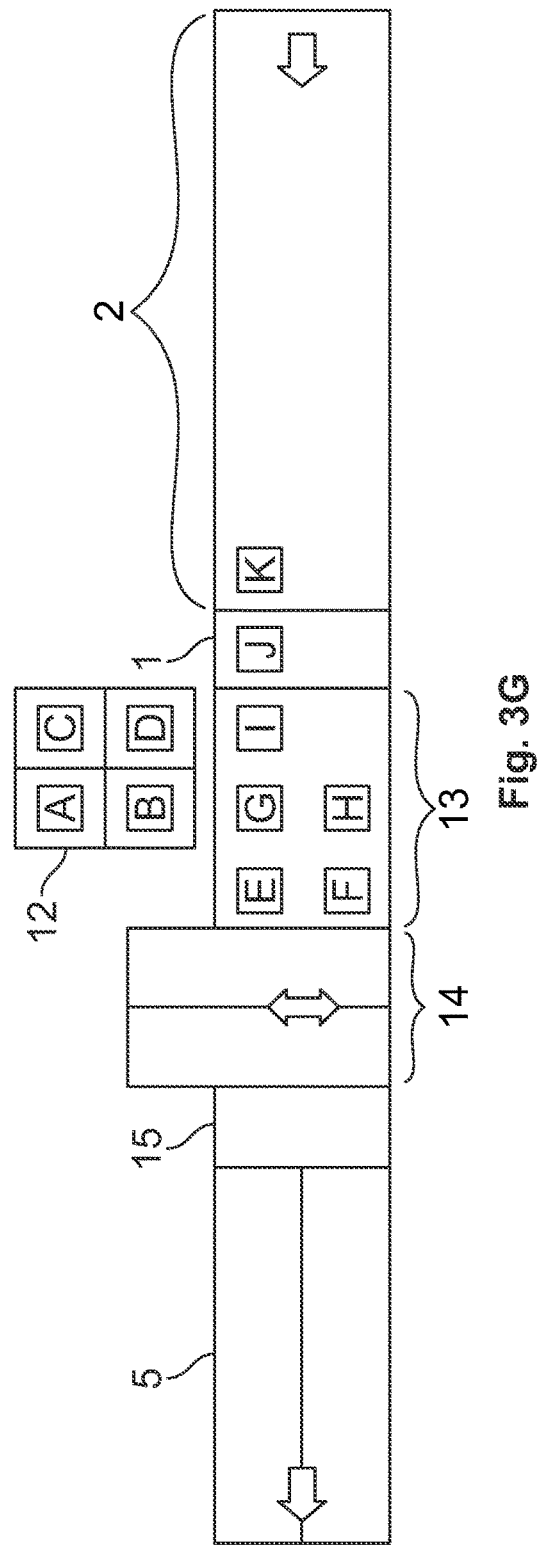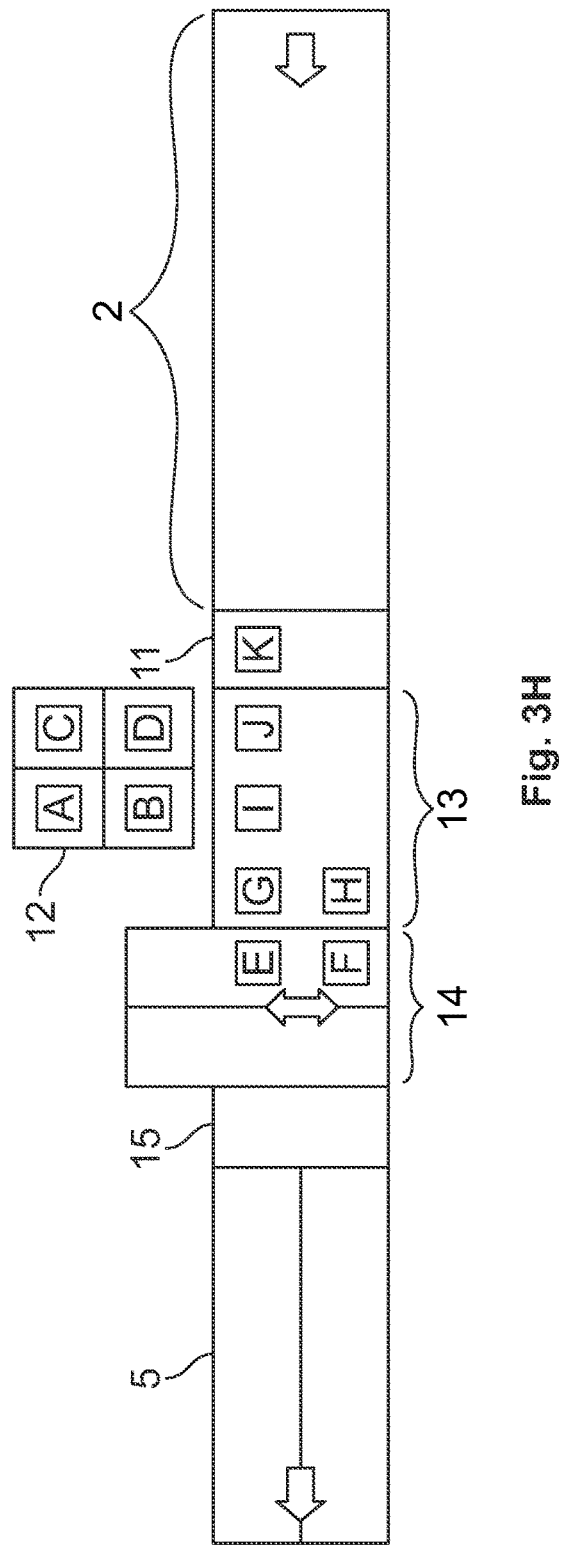

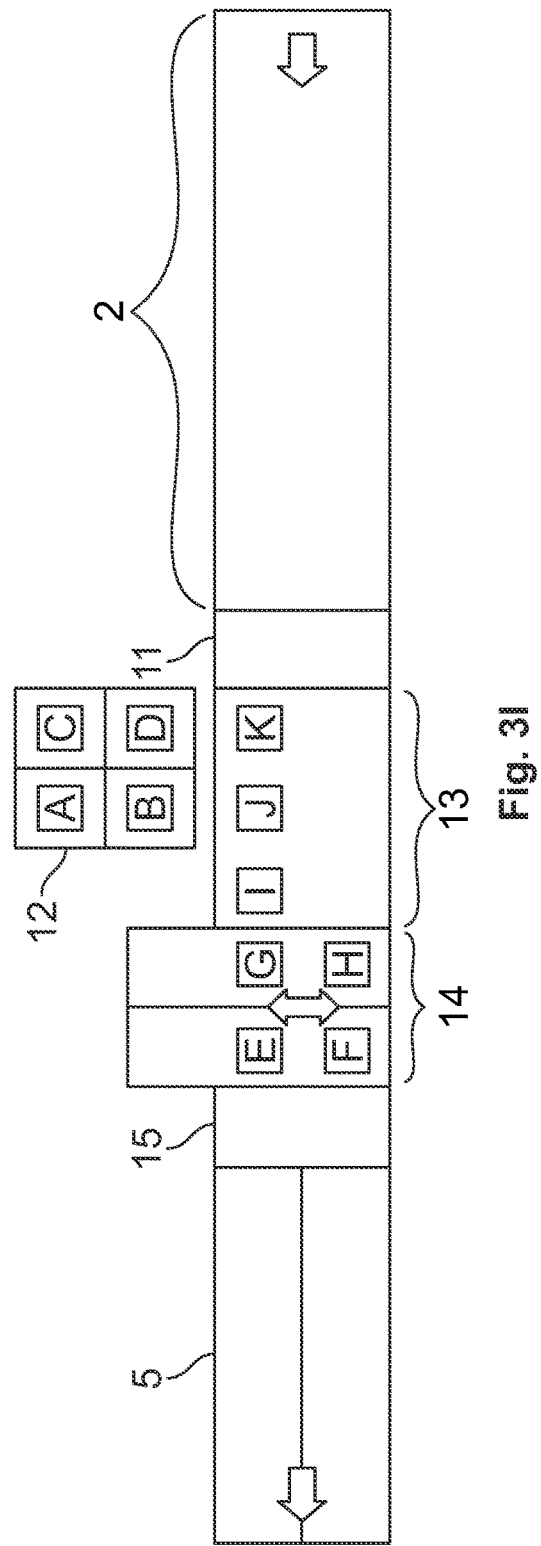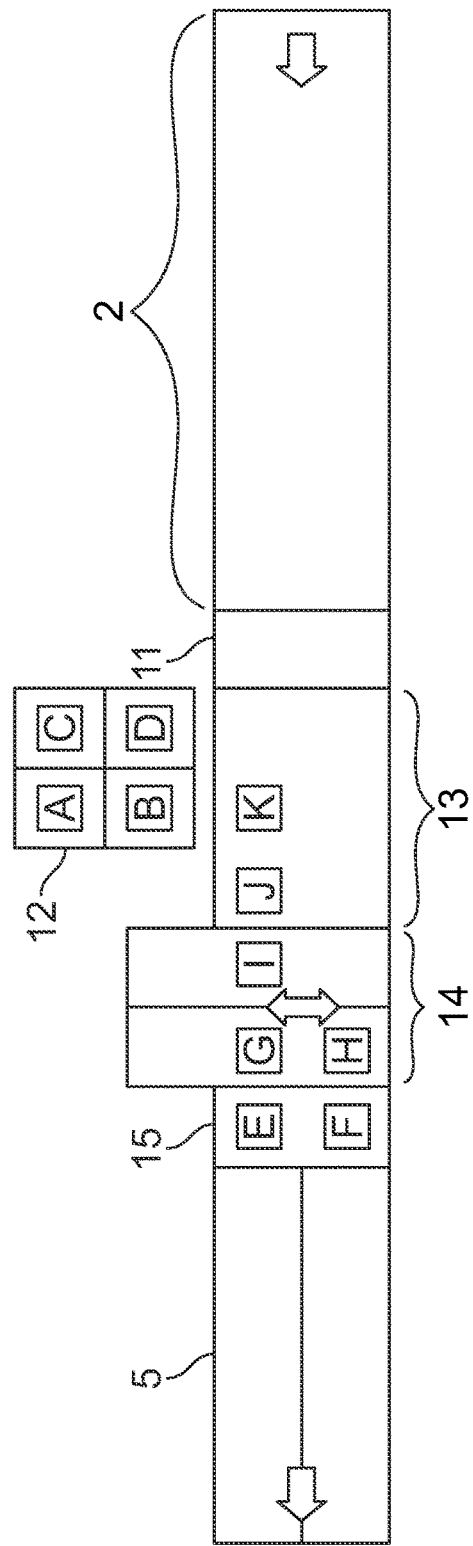

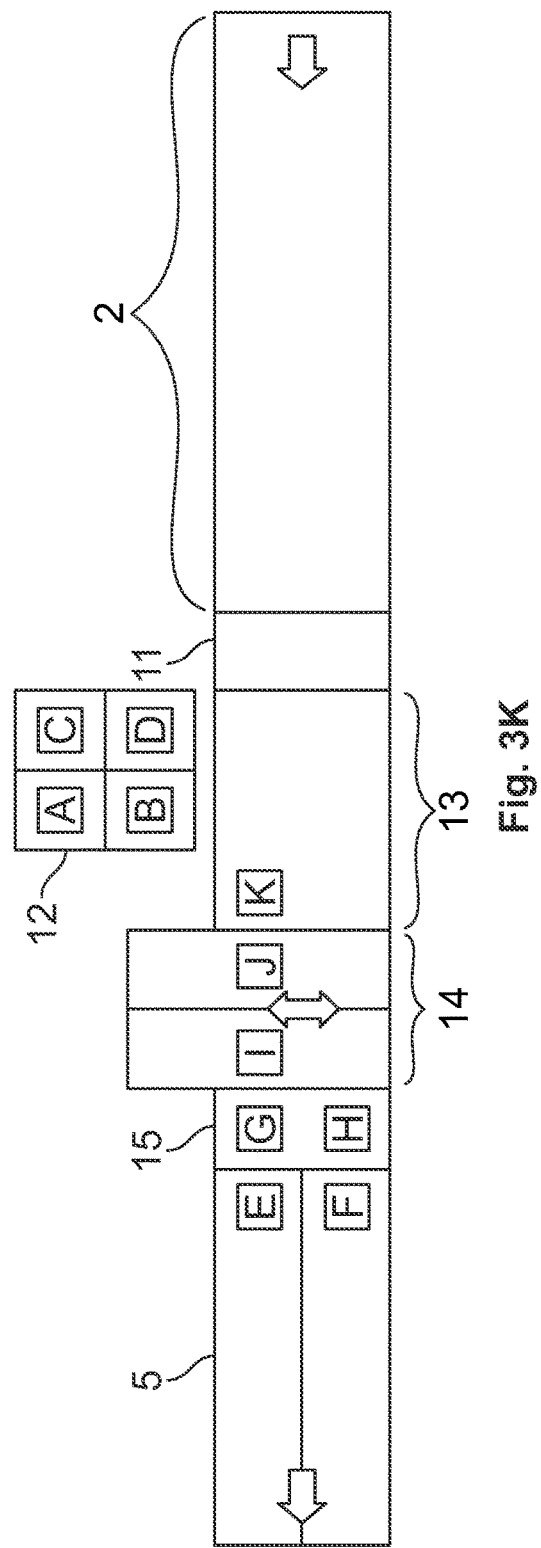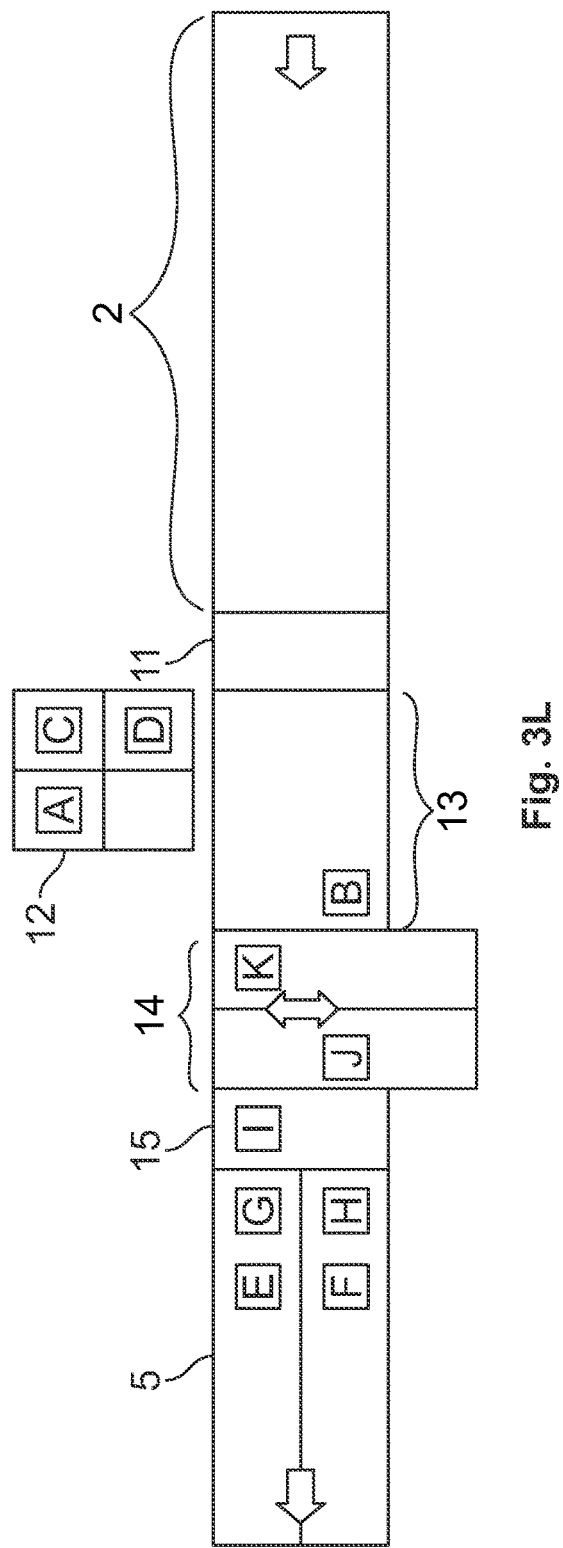

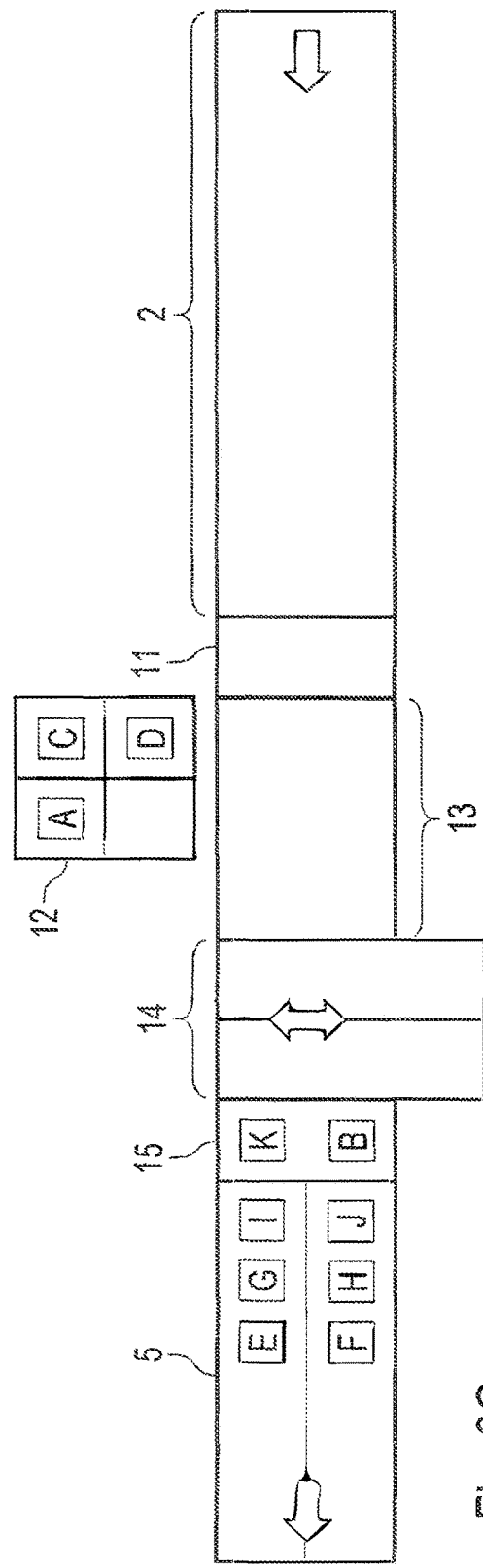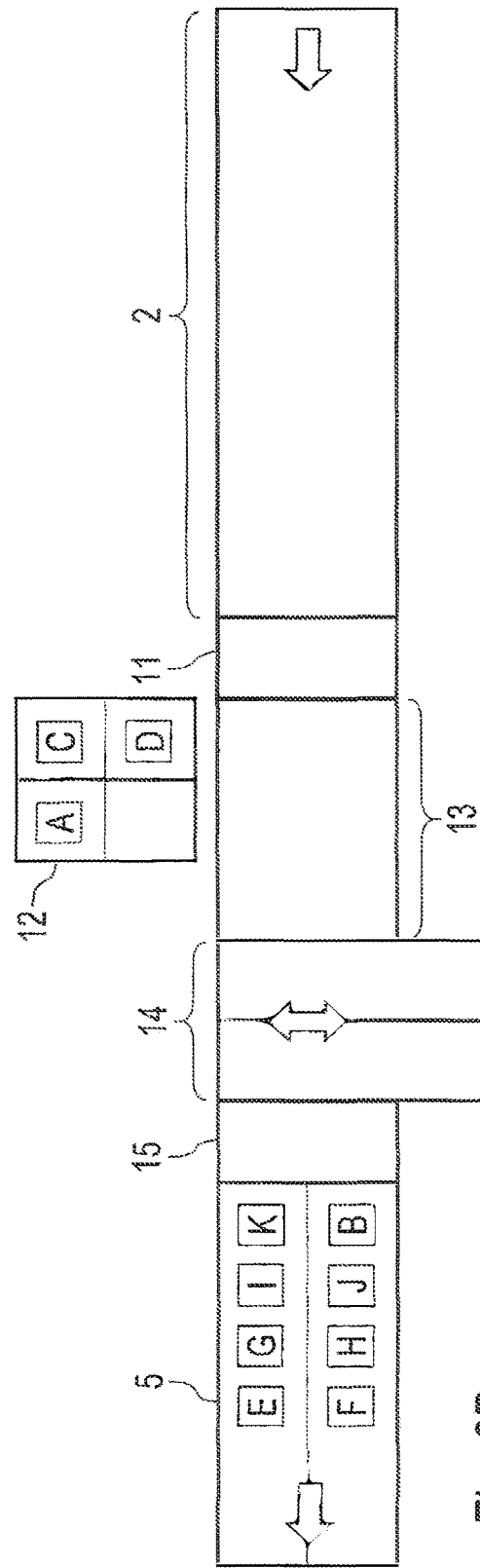

CONVEYOR DEVICE FOR CONVEYING FOOD PRODUCTS

CROSS-REFERENCE TO RELATED APPLICATION(S)

This present application is a divisional application of co-pending U.S. Non-Provisional patent application Ser. No. 17/645,562, filed on Dec. 21, 2021, which is a divisional application of U.S. Non-Provisional patent application Ser. No. 17/062,893, filed on Oct. 5, 2020, now U.S. Pat. No. 11,225,347, which is a divisional application of co-pending U.S. Non-Provisional patent application Ser. No. 16/663, 943, filed Oct. 25, 2019, now U.S. Pat. No. 10,807,748, which is a divisional application of U.S. Non-Provisional patent application Ser. No. 16/058,078, filed Aug. 8, 2018, now U.S. Pat. No. 10,457,433, which is a continuation of U.S. Non-Provisional patent application Ser. No. 14/628, 434, filed Feb. 23, 2015, now U.S. Pat. No. 10,065,757, which claims the priority benefit of German Patent Application No. 10 2014 002 530.6, filed Feb. 24, 2014, all of which are incorporated by reference herein.

FIELD OF THE DISCLOSURE

The invention relates to a method of using a conveyor device for conveying food products on a plurality of parallel conveyor tracks and for formatting the food products in a specific product format, especially for conveying and formatting stacks or interleaved units made of a plurality of slices of cheese or meat products.

BACKGROUND

Known from EP 2 420 363 A1 is a slicer that makes it possible to slice food products (e.g. salami, ham, cheese) into slices, wherein the slicer conveys the food products to be sliced through the slicing device on a plurality of parallel conveyor tracks, then slices them and outputs them on the output side. The conveying speed and thus the advance of the individual food products may be adjusted separately for the individual conveyor tracks.

FIG. 4 is a top view of a conventional processing line having such a slicing device 1 with an output conveyor 2 with two parallel conveyor tracks 3, 4. The output side of the output conveyor 2 for the slicing device 1 is connected to an input conveyor 5 for a feeder 6, wherein the input conveyor 5 for the feeder 6 also has two parallel conveyor tracks 7, 8. The feeder 6 has the task of placing in packaging the sliced food products A-K that are received on the input side. The structure and functioning of the feeder 6 is known per se from the prior art and therefore need not be described in greater detail.

During the slicing process, the slicing device 1 initially outputs on the output conveyor 2 pairs A-B, C-D, E-F, and G-H of the food products A-K so that initially the two conveyor tracks 3, 4 are supplied with two adjacently disposed food products. The feeder 6 is able to process this product format with two adjacently disposed food products with no problem.

However, normally during a slicing process product gaps 9 occur in one of the two conveyor tracks 3, 4 for the slicing device 1.

One possible cause of the product gaps 9 is that the food product to be sliced that is on the conveyor track 4 was shorter prior to being sliced than the food product to be sliced that is on the conveyor track 3 so that the food product on the conveyor track 4 is used up earlier than the food product on the conveyor track 3, which then leads to product gaps 9. This cause of the product gaps 9 is relevant for instance if the products in question are natural products (e.g. ham) that do not have a defined length but whose lengths instead are subject to natural fluctuations.

Another potential cause of product gaps 9 is that the slicing device 1 slices the food products in the two conveyor tracks 3, 4 with a different slice thickness.

Another potential cause of the product gaps 9 is that the portion sizes of the food products A-K or B-H in the two conveyor tracks 3 and 4 are different in size. For instance, if the food products B-H in the left-hand conveyor track 4 are for instance stacks of meat slices having a total weight of 200 grams each, that food product will be finished earlier than in the right-hand conveyor track 3, if the individual food products A-K there are stacks of slices having a total weight of 100 grams each.

Regardless of the various possible causes of the product gaps 9, the product format at the input to the feeder 6 then no longer meets the requirements of the feeder 6, because the latter expects that the two conveyor tracks 7, 8 of the input conveyor 5 for the feeder 6 both have food products, In contrast, a product gap in one of the two conveyor tracks 7, 8 at the input for the feeder 6 can lead to problems.

SUMMARY

The underlying object of the invention is therefore to prevent such product gaps when food products are sliced on a plurality of parallel conveyor tracks having separately adjustable conveyor speeds.

This object is attained using an inventive conveyor device and a corresponding method in accordance with the independent claims The invention includes the general technical teaching of filling with food products any product gaps on one of the conveyor tracks at the output of a slicing device so that when possible both conveyor tracks are always supplied with food products at the output of the slicing device.

The invention therefore provides a conveyor device that is arranged downstream of the slicing device, in the conveying direction, and thus transfers sliced food products (e.g. stacks of sliced cold cuts) to a plurality of parallel conveyor tracks.

The food products may be for instance slices of cold cuts, ham, salami, or cheese; however, the invention is not limited to these food products but rather may also be realized with other food products.

It should also be noted that the slicing device may provide the food products for instance as stacks or interleaved units made of a plurality of slices. However, the invention is not limited to stacks or interleaved units in terms of how product supplied by the slicing device is presented, but rather may also be realized with product being presented in another manner. For instance, the individual slices may also be arranged in a circle or oval. Moreover, it is possible within the context of the invention for the individual slices to be offset or interleaved. It is furthermore possible for the individual slices to be folded. Such product presentations are known per se from the prior art and therefore do not require more detailed description.

The inventive conveyor device now ensures that any product gaps on one of the parallel conveyor tracks are filled with a food product so that at the output side all parallel conveyor tracks are supplied with the food products. The inventive conveyor devices thus provides on the output side a product format that comprises a plurality of parallel food products (e.g. stacks of slices). This is advantageous because such a product format is important for a downstream feeder for product packaging.

If there is an even number of product gaps on one of the conveyor tracks, the product gap may be filled with an excess food product from the other conveyor track with nothing further. For instance, if the right-hand conveyor track includes eight food products (e.g. stacks of slices), while the left-hand conveyor track contains only six food products (e.g. stacks of slices), one food product may be transferred from the right-hand conveyor track to the left-hand conveyor track so that then both conveyor tracks each include food products one after the other. The result is thus that all of the conveyor tracks are supplied with food products at the output of the inventive conveyor device.

However, if there is an odd number of product gaps in one of the conveyor tracks, this manner of filling the product gaps is not adequate for ensuring that all of the conveyor tracks are supplied with food products at the output of the conveyor device. For instance, if the right-hand conveyor track includes eight food products (e.g. stacks of slices), while the left-hand conveyor track includes only five food products (e.g. stacks of slices), one of the three product gaps in the left-hand conveyor track may be supplied with one food product from the right-hand conveyor track. As a result, the right-hand conveyor track then includes seven food products one after the other, while the left-hand conveyor track includes only six food products and still has a product gap. For such cases, the inventive conveyor device preferably has one product buffer that includes at least one food product so that the remaining product gap in the left-hand conveyor track may then be filled with one of the food products in the product buffer.

The product gaps in one of the conveyor tracks are thus first filled with food products from the other conveyor track when this is possible. The food products held ready in the product buffer are then preferably used for filling product gaps only if this should be necessary because the number of product gaps in one of the conveyor tracks is uneven.

However, it would also be possible in principle in the context of the invention for the product gaps in one of the conveyor tracks to be filled only from the product buffer.

Furthermore, in principle it is also possible for the product gaps in one of the conveyor tracks to be filled only with food products from the other conveyor tracks. Preferably, however, the two manners of filling product gaps explained in the foregoing are combined with one another.

In one preferred exemplary embodiment of the invention the conveyor device has a distributor conveyor that selectively distributes the food products incoming on the input side to a main flow or to the product buffer.

The product buffer is formed by a buffer conveyor that is supplied with the food products by the distributor conveyor. The distributor conveyor preferably conducts the food products incoming on the input side onto buffer conveyor until the buffer conveyor is filled. This is advantageous because then there is always sufficient food products on the buffer conveyor for filling product gaps in one of the conveyor tracks. When a buffer conveyor is completely or adequately filled, however, the distributor conveyor preferably conducts the food products incoming on the input side into the main flow to a downstream main flow conveyor. In the preferred embodiment, the main flow conveyor does not have to be supplied with food products only by the distributor conveyor, however, but instead may also be supplied by the buffer conveyor if this should be necessary for filling product gaps.

Moreover, the inventive conveyor device has a transfer device that can transfer food products between the parallel conveyor tracks for filling product gaps.

In the preferred exemplary embodiment, the transfer device is a so-called shuttle conveyor that may be displaced as a whole transverse to the direction of conveyance in order to displace between the conveyor tracks the food products incoming on the input side of the shuttle conveyor. The shuttle conveyor therefore as a rule has a wider conveyor width than the other components of the conveyor device so that the shuttle conveyor, regardless of its displacement position transverse to the direction of conveyance, always covers the entire width of the other conveyor belt.

However, alternatively it is also possible for a transfer robot to be employed as the transfer device and for it to be able to pick up a food product from the conveyor belt and to put it down again on another conveyor track. Such transfer robots are known per se from the prior art and therefore need not be described in greater detail.

It has already been mentioned that the distributor conveyor can selectively conduct the food products (e.g. stacks of slices) that are incoming on the input side to the buffer conveyor or to the main flow conveyor. This distribution preferably occurs using a vertical pivot movement by the distributor conveyor, which enables a rapid change. The output end of the distributor conveyor is therefore preferably vertically adjustable between the buffer conveyor and the main flow conveyor in order to selectively supply the buffer conveyor or the main flow conveyor with the food products incoming on the input side.

The buffer conveyor is preferably disposed above the main flow conveyor and its output end may likewise be adjusted vertically.

If a product gap must be filled with a food product from the buffer conveyor, the output end of the buffer conveyor may be lowered to the main flow conveyor in order to place one of the food products from the buffer conveyor on the main flow conveyor for subsequently filling a product gap.

In contrast, if no product gap needs to be filled, the output end of the buffer conveyor is raised from the main flow conveyor so that the main flow of the food products may then be advanced on the main flow conveyor undisturbed by the buffer conveyor.

In the preferred exemplary embodiment of the invention, the conveying speed of the individual conveyor tracks with the buffer conveyor may be adjusted separately from one another. This is important so that a single food product may be transferred from only one of the conveyor tracks of the buffer conveyor onto the main flow conveyor. To this end, a conveyor track of the buffer conveyor is then activated and then conveys the food product therefrom, while the other conveyor tracks of the buffer conveyor do not move.

Moreover, a transfer conveyor having a plurality of parallel conveyor tracks is preferably provided, wherein the transfer conveyor is arranged, in the direction of conveyance, downstream of the transfer device (e.g. shuttle conveyor, transfer robot) and is supplied with food products by the transfer device. What is important here is that even for the transfer conveyor the conveying speed of the individual conveyor tracks may be adjusted separately from one another in order to transfer only one individual food product to only one of the conveyor tracks.

To avoid misunderstanding, it is hereby noted that the term conveyor track used in the context of the invention means a conveyor track that is wide enough to receive a food product. In a conveyor having three parallel conveyor tracks, therefore, three food products may be conveyed adjacent to one another. In contrast, the term conveyor track does not as a rule imply that the conveying speed of the conveyor track is individually adjustable. Thus within the context of the invention there must be a differentiation between conveyors having a plurality of conveyor tracks with a uniform conveying speed, on the one hand, and conveyors having a plurality of conveyor tracks, each with separately adjustable conveying speeds, on the other hand. The conveying speeds of the individual conveyor tracks are preferably separately adjustable for the buffer conveyor and for the transfer conveyor. In contrast, the individual conveyor tracks in the other conveyors preferably have a uniform conveying speed.

With regard to the transfer conveyor, it should also be noted that the latter may also be arranged in a device downstream, such as for instance in a feeder, as will be described in detail hereinafter.

It should furthermore be noted that the inventive conveyor device preferably has at least one product sensor that at the input of the conveyor device detects the product supply in the individual conveyor tracks individually for each of the conveyor tracks. Such product sensors may function for instance by means of a camera, an ultrasound sensor, or using mechanical scanning, but the invention is not limited to these principles for the functioning of the product sensor.

The inventive conveyor device furthermore preferably includes a control unit that is connected at the input side to the product sensors in order to detect the supply of the conveyor tracks at the input to the conveyor device. Moreover, the control unit controls the following actions of the conveyor device on the output side:

the pivot movement of the distributor conveyor,
the pivot movement of the buffer conveyor,
the conveying speed of the individual conveyor tracks of the buffer conveyor,
the transverse displacement of the shuttle conveyor or the transfer movement of the transfer robot,
the conveying speed of the individual conveyor tracks of the transfer conveyor,
the conveying speed of the main flow conveyor, and,
the conveying speed of the distributor conveyor.

The aforesaid actions are controlled such that as many product gaps as possible in the conveyor tracks are filled at the output.

It should furthermore be noted that the invention is not limited to the conveyor device described in the foregoing as an individual device. On the contrary, the invention also claims protection for a complete processing line for processing the food products having a slicing device, the inventive conveyor device, and a feeder for placing the food products in packaging.

Finally, the invention also includes a corresponding method for product formatting of food products on a conveyor device, wherein the individual method steps proceed from the description in the foregoing, so that no separate description of the individual method steps shah be provided here.

Other advantageous refinements of the invention are characterized in the subordinate claims or are explained in greater detail in the following, using the figures, together with the description of the preferred exemplary embodiments of the invention.

BRIEF DESCRIPTION OF THE DRAWINGS

FIG. 1A is a perspective elevation of an inventive conveyor device;

FIG. 1E is a top view of the conveyor device in accordance with FIGS. 1A-1D;

DETAILED DESCRIPTION

Figure 1B:
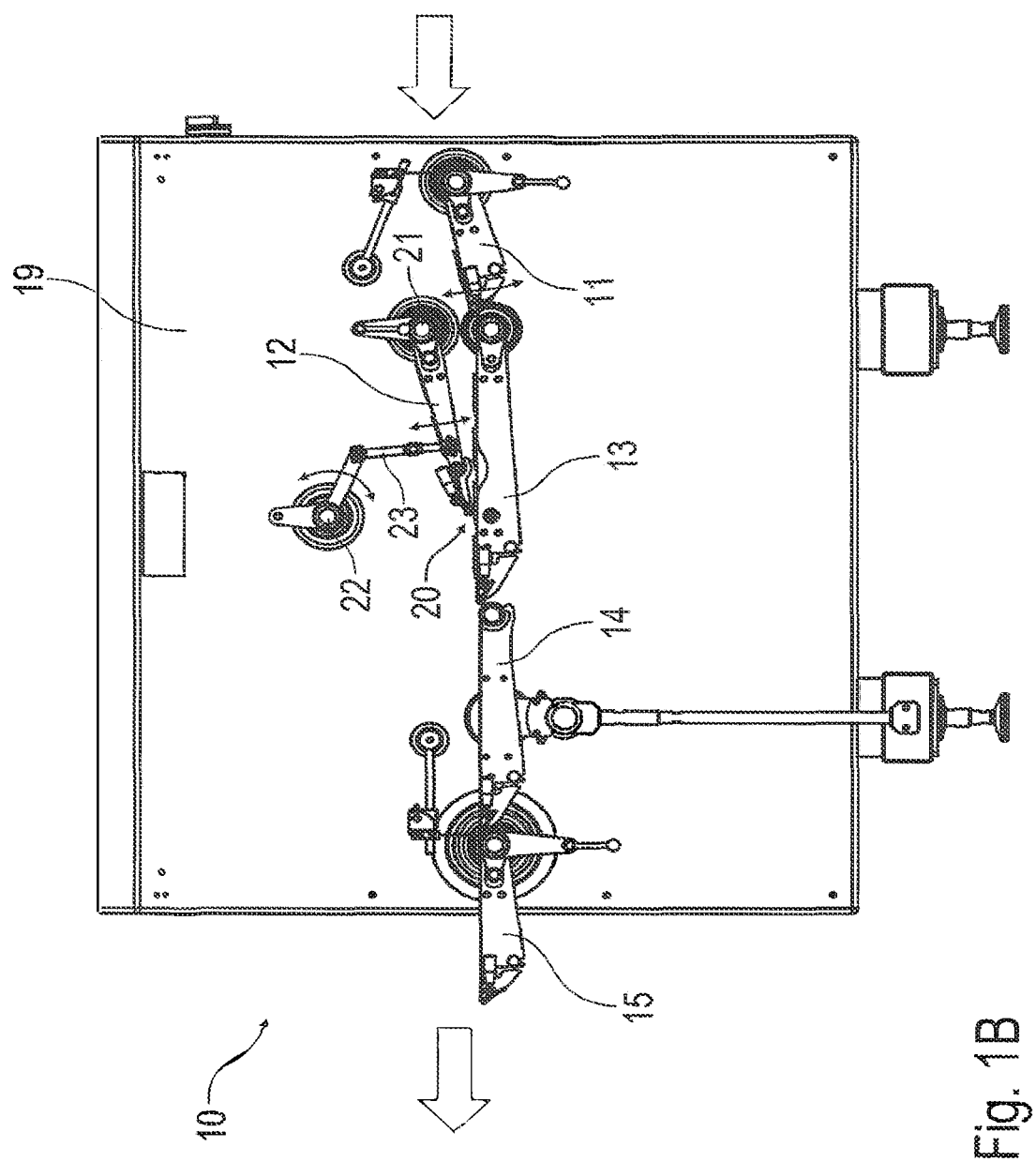
FIG. 1B is a side view of the conveyor device from FIG. 1A.
Figure 1C:
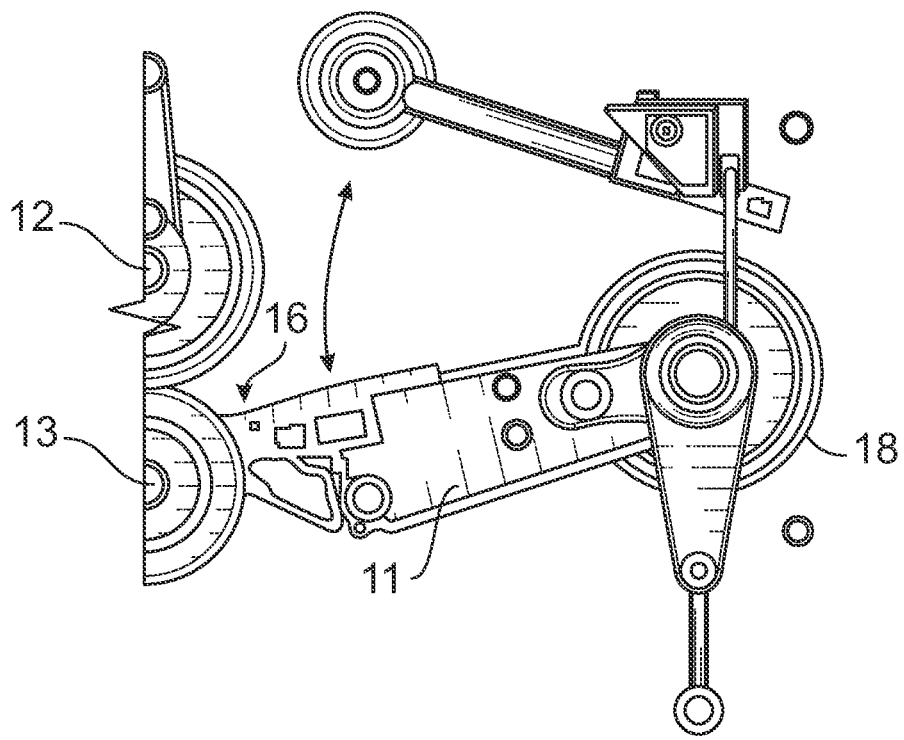
FIG. 1C is an enlarged detail from FIG. 1B in the input area of the conveyor device.
Figure 1D:
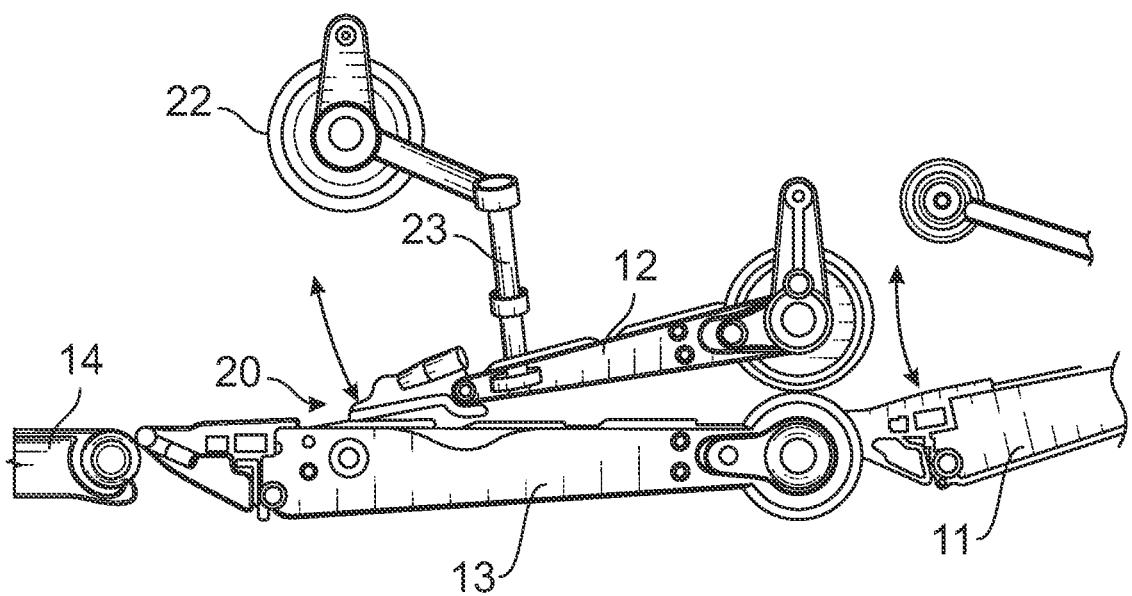
FIG. 1D is an enlargement of a detail from FIG. 1B in the center area of the conveyor device.
Figure 1F:
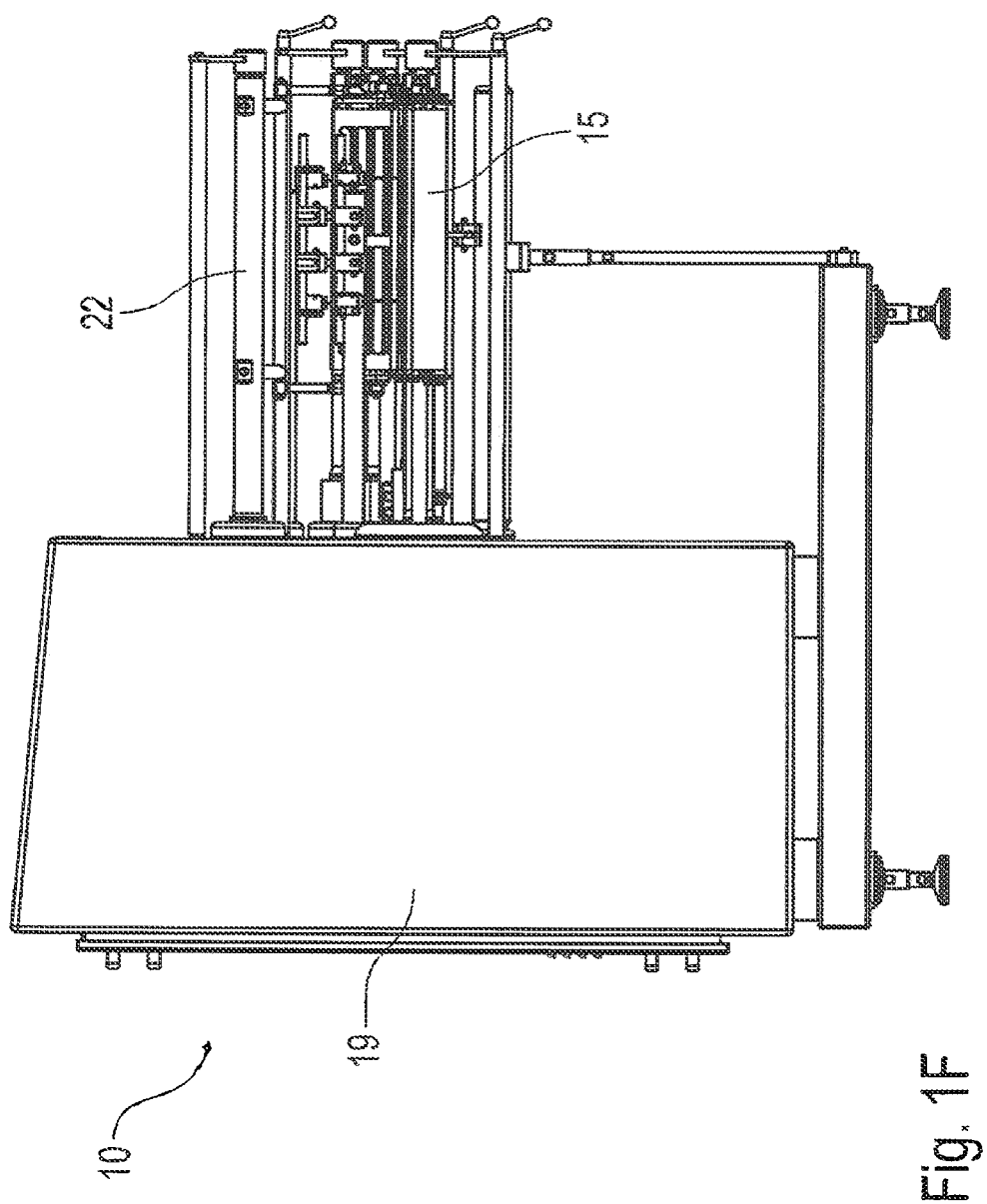
FIG. 1F is a front elevation of the conveyor device in accordance with FIGS. 1A-1E from the output side.
Figure 2:
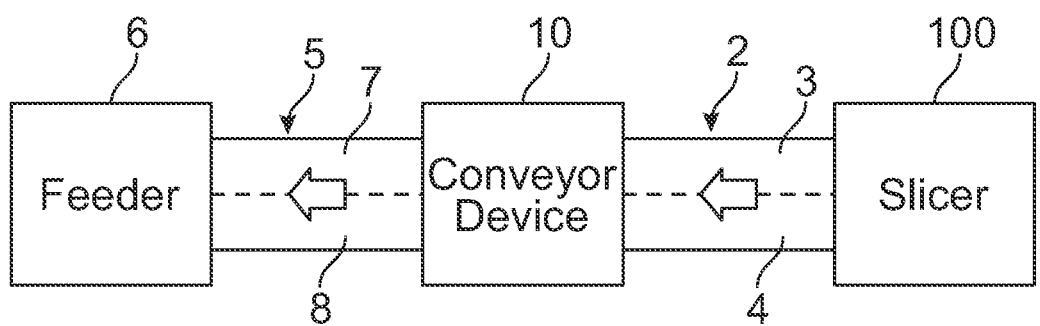
FIG. 2 depicts an inventive processing line for processing food products.

FIGS. 1A through 1F depict different views of an inventive conveyor device 10 for conveying food products (e.g. stacks of lunchmeat slices) from the slicing device 1 to the feeder 6, as is depicted in FIG. 2. The conveyor device 10 has the object of filling any product gaps on one of the conveyor tracks 3, 4 of the output conveyor 2 of the slicing device 1 so that the two conveyor tracks 7, 8 of the input conveyor 5 for the feeder 6 are all supplied with food products at all times. This is important because for proper functioning the feeder 6 expects a product format in which all conveyor tracks 7, 8 of the input conveyor 5 are supplied with food products.

The inventive conveyor device includes a plurality of conveyors that have different functions, specifically a distributor conveyor 11, a buffer conveyor 12, a main flow conveyor 13, a shuttle conveyor 14, and an output conveyor 15, wherein the food products are conveyed by the conveyor device 10 in the direction of the block arrow shown in FIG. 1B.

The distributor conveyor 11 transfers the food products incoming on the input side from the output conveyor 2 for the slicing device 1 and selectively forwards the incoming food products to the buffer conveyor 12 or to the main flow conveyor 13. To this end, the output end 16 of the distributor conveyor 11 may be pivoted vertically between the buffer conveyor 12 disposed above and the main flow conveyor 13 disposed below. The distributor conveyor 11 may thus be pivoted about a pivot axis 17 in the direction of the double arrow. The pivot movement by the distributor conveyor 11 is driven by a drive shaft 18 that projects laterally from a housing 19 of the conveyor device 10 and may be driven by an electric motor, for instance.

In addition, the conveyor device 10 also has on its input side a plurality of sensors 24 that determine on the individual conveyor tracks 3, 4 whether the conveyor tracks 3, 4 are supplied with food products. This is important so that the product gaps in the conveyor tracks 3, 4 may subsequently be filled with food products.

The main flow conveyor 13 is arranged beneath the buffer conveyor 12 and conveys a main flow of the food products beneath the raised buffer conveyor 12.

The shuttle conveyor 14 is arranged downstream of the main flow conveyor 13 in the conveying direction, wherein the shuttle conveyor 14 may be displaced as a whole at a right angle to the conveying direction, as is indicated by the double arrow in FIG. 1A. The shuttle conveyor 14 is preferably displaced using electric motors in the housing 19 of the conveyor device 10. It should be noted that the shuttle conveyor 14 has a wider conveyor width than the main flow conveyor 13 and the output conveyor 15. This is important so that the shuttle conveyor 14 always covers the entire conveyor width regardless of its displacement position transverse to the conveying direction.

Arranged in the conveying direction downstream of the shuttle conveyor 14 is the output conveyor 15, which forwards the food products to the input conveyor 5 for the feeder 6. What is important here is that the input conveyor 5 for the feeder 6 has separately controllable conveyor tracks 7, 8 in order to be able to transfer the food products for the individual conveyor tracks 7, 8 independently of one another from the output conveyor 15 for the conveyor device 10.

The buffer conveyor 12 is arranged above the main flow conveyor 13, wherein the buffer conveyor 12 has an output end 20 that may be selectively lowered to the main flow conveyor 13 or raised from the main flow conveyor 13, as shall be described in detail in the following. The buffer conveyor 12 may thus be pivoted about a pivot axis 21 in the direction of the double arrow, wherein the pivot movement is driven via a drive shaft 22 and a lever structure 23. The drive shaft 22 for pivoting the buffer conveyor 12 projects laterally out of the housing 19 of the conveyor device 10 and is preferably also driven by an electric motor.

If a product gap on one of the conveyor tracks must be filled, the output end 20 of the buffer conveyor 12 is lowered to the main flow conveyor 13 so that a food product may be transferred from the buffer conveyor 12 to the main flow conveyor 13.

In contrast, if no product gap needs to be filled, the output end 20 of the buffer conveyor 12 is raised from the main flow conveyor 13 so that the main flow of food products on the main flow conveyor is not blocked.

Figure 3A:
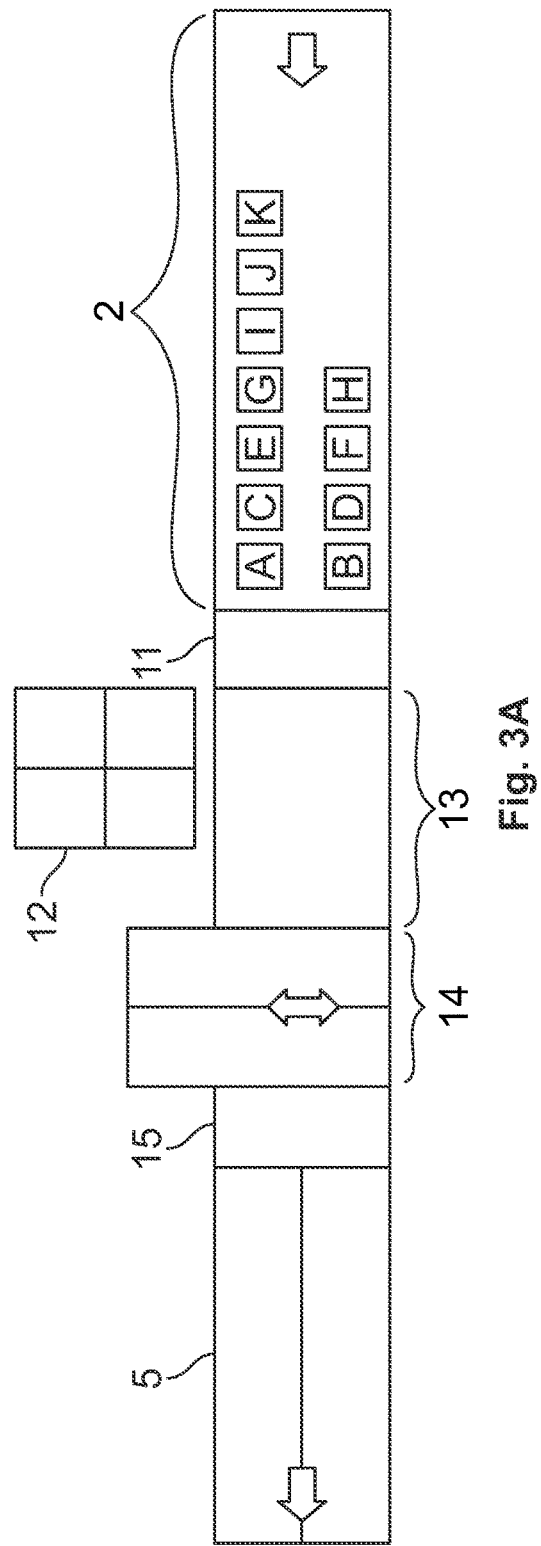
FIGS. 3A-3P are schematized top views of successive situations of the conveyor device; and, FIG. 4 is a schematized top view of a conventional processing line having slicing device and a feeder.
Figure 3B:
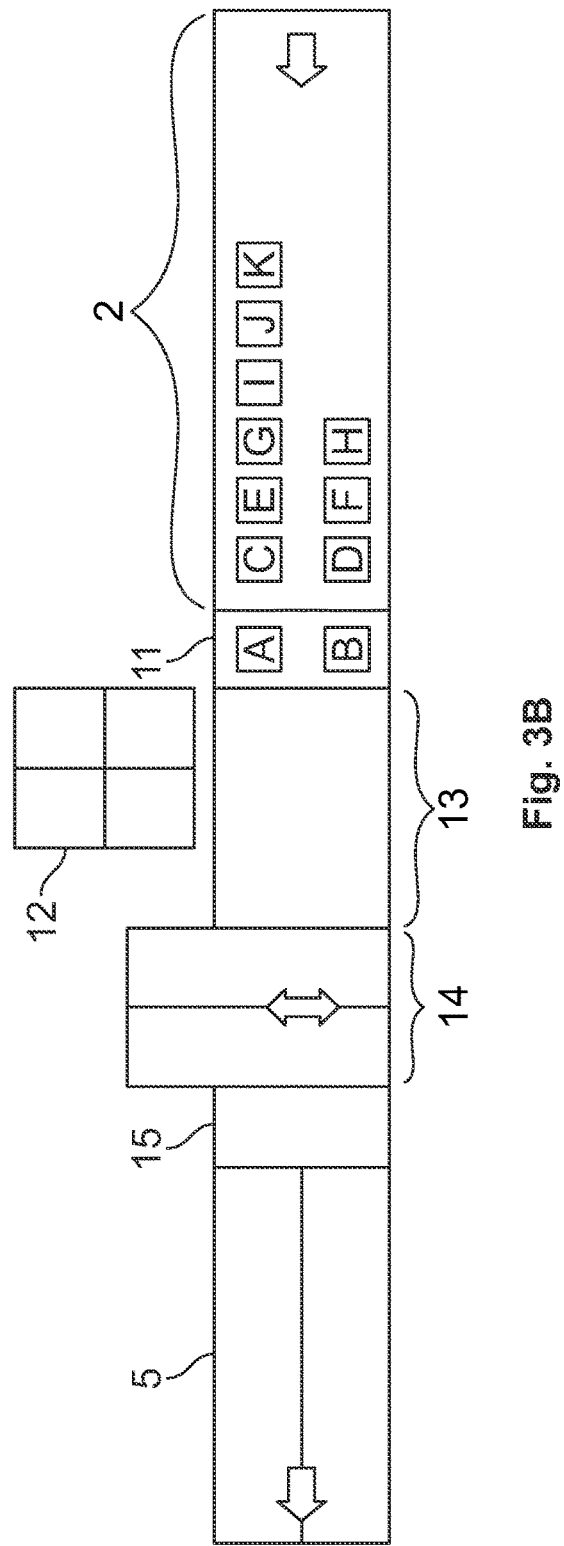
Figure 3M:
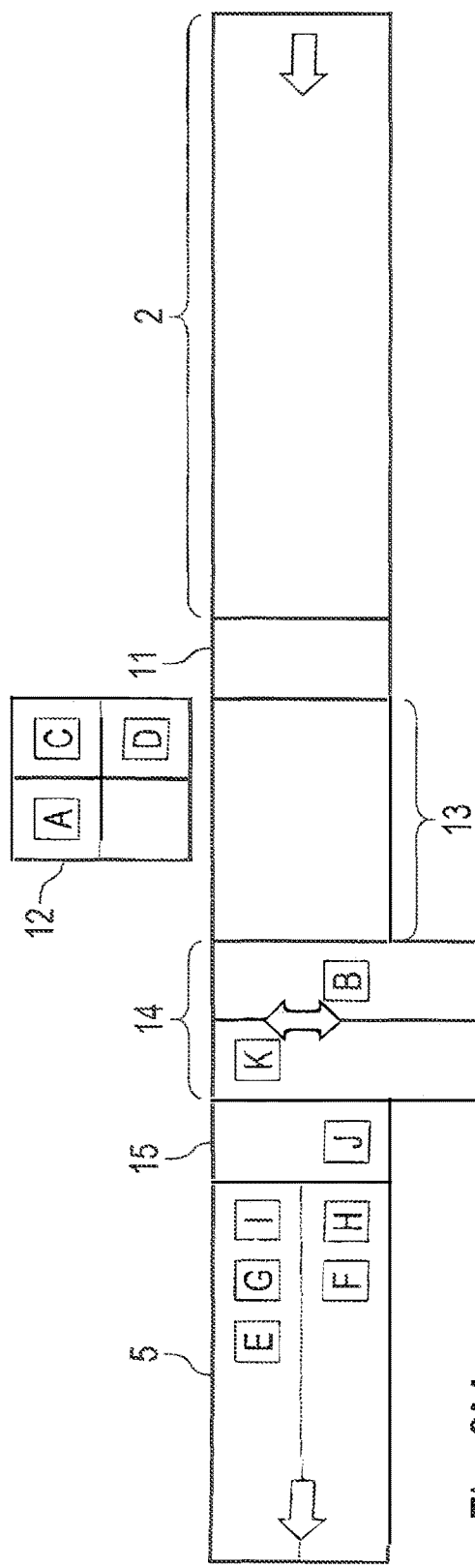
Figure 3N:
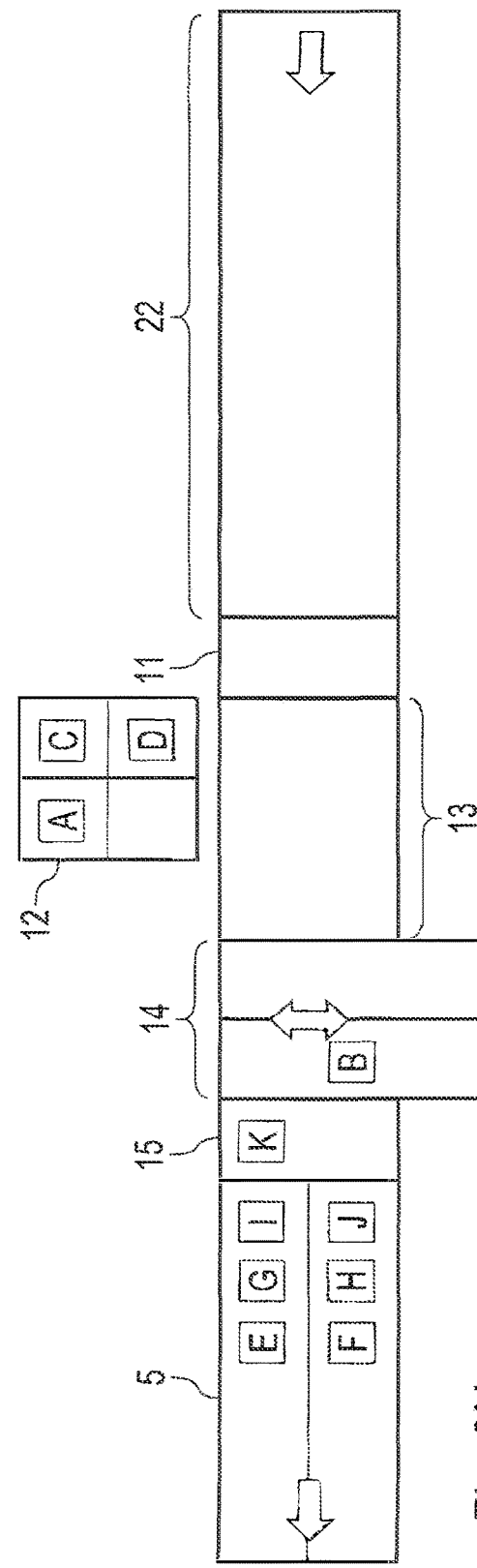
Figure 4:
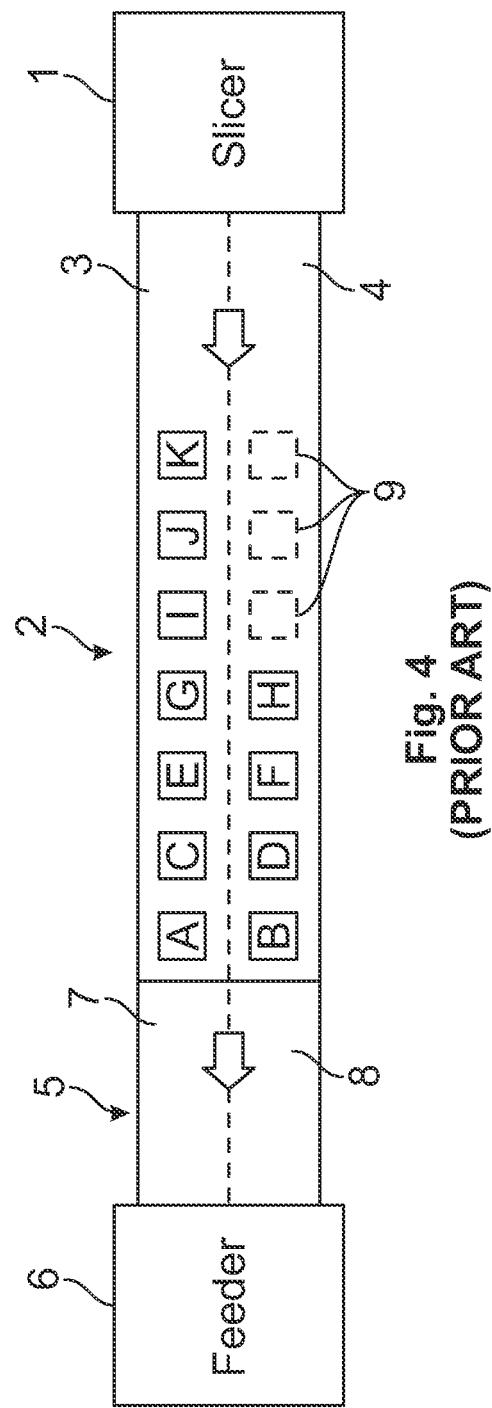

The following describes how the inventive conveyor device 10 functions, referencing FIGS. 3A-3B. FIGS. 3A and 3B each depict successive situations during the operation of the conveyor device 10.

For the purposes of simplification, the buffer conveyor 12 is depicted in the top-view depictions in accordance with FIGS. 3A-3B adjacent to the main flow conveyor 13 in order to make it possible to discern the supply status of the main flow conveyor 13. However, the buffer conveyor 12 is in fact above the main flow conveyor 13, as may be seen from FIGS. 1A-1F.

In the situation in accordance with FIG. 3A, food products A-K enter on two parallel conveyor tracks on the output conveyor 2 of the slicing device 1. On the left-hand conveyor track, following the last food product H, there are three product gaps that are filled in the context of the inventive method, as shall be described in the following.

FIG. 3B illustrates the next situation, wherein the two first food products A, B have moved onto the distributor conveyor 11.

In the next operating situation in accordance with FIG. 3C, first the buffer conveyor 12 is filled in that the distributor conveyor 11 conducts the two food products A, B onto the buffer conveyor. To this end the distributor conveyor 11 is pivoted upward.

In the situation in accordance with FIG. 3D, the buffer conveyor 12 is still being filled as well, so that the buffer conveyor 12 then includes food products A, B, C, and D.

Following this the distributor conveyor 11 is then pivoted downward to the main flow conveyor 13, whereupon the food products E, F are then conducted onto the main flow conveyor 13, as is illustrated in FIG. 3E.

In method steps 3F-3H, the food products E-K are then further conveyed to the shuttle conveyor 14 so that the food products E, F are then disposed on the shuttle conveyor 14, as is illustrated in FIG. 3H.

The food products E-K are then further conveyed via the shuttle conveyor 14 and the output conveyor 15, as is illustrated in FIGS. 3I-3K.

In method step 3L, the shuttle conveyor 14 is then displaced to the left with respect to the conveyor device, which causes the food product J to be transferred from the right-hand conveyor track to the left-hand conveyor track.

In addition, in the situation in accordance with FIG. 3L, the buffer conveyor 12 is lowered onto the main flow conveyor 13, whereupon the food product B is then transferred from the left-hand conveyor track of the buffer conveyor 12 to the left-hand conveyor track of the main flow conveyor 13.

Following this the food products J, K, and B are then conveyed further via the shuttle conveyor 14, and the food product B on the shuttle conveyor 14 then fills the last product gap adjacent to the food product K on the output conveyor 15, as is illustrated in FIG. 3O.

FIG. 3P illustrates the last step, in which the food products are arranged on the input conveyor 5 for the feeder 6 in a product format that is suitable for the feeder 6. In this product format, both product tracks are filled with two adjacent food products E-F, and K-B.

The invention is not limited to the preferred exemplary embodiment described in the foregoing. On the contrary, a plethora of variants and deviations are possible that also make use of the inventive thought and therefore fall within the scope of protection. The invention also claims in particular protection for the subject and the features of the subordinate claims, regardless of the claims referenced. It is therefore also possible within the context of the invention to realize the subject of the main claim without all of the features of the main claim, but with some features from the subordinate claims.

REFERENCE LIST

A-K Food products
1 Slicing device
2 Output conveyor for the slicing device
3 Right-hand conveyor track of the output conveyor for the slicing device
4 Left-hand conveyor track of the output conveyor for the slicing device
5 Input conveyor for the feeder
6 Feeder
7 Right-hand conveyor track of the input conveyor for the feeder
8 Left-hand conveyor track of the input conveyor for the feeder
9 Product gaps
10 Conveyor device
11 Distributor conveyor
12 Buffer conveyor
13 Main flow conveyor
14 Shuttle conveyor
15 Output conveyor
16 Output end of the distributor conveyor
17 Pivot axis of the distributor conveyor
18 Drive shaft for pivoting the buffer conveyor
19 Housing
20 Output end of the buffer conveyor
21 Pivot axis of the buffer conveyor 22 Drive shaft for pivoting the buffer conveyor
23 Lever structure for pivoting the buffer conveyor
24 Sensor

What is claimed is:

1. A method for formatting food products on a conveyor device comprising:
   a) receiving the food products in a plurality of parallel conveyor tracks, some of which include product gaps;
   b) outputting the food products into the plurality of parallel conveyor tracks in a specific product format;
   c) detecting a product supply in the plurality of parallel conveyor tracks incoming on an input side individually for each one of the plurality of parallel conveyor tracks; and
   d) filling the product gaps in the plurality of parallel conveyor tracks with food products, so that all of the plurality of parallel conveyor tracks are supplied with the food products on an output side, wherein only when an odd number of product gaps exist in one of the plurality of parallel conveyor tracks, the product gaps are also filled with food products from a product buffer in that at least one of the food products is transferred from the product buffer to the one of the plurality of parallel conveyor tracks on which an odd number of product gaps exist.

2. The method in accordance with claim 1, further comprising:
   selectively distributing the food products incoming on the input side to the product buffer or to a main flow of the food products, which main flow passes through to the output side.

3. The method in accordance with claim 2, wherein the product buffer is supplied first.

4. The method in accordance with claim 2, further comprising:
   a) detecting the food products added to the product buffer;
   b) detecting the food products removed from the product buffer;
   c) determining a filling status of the product buffer from the added food products and from the removed food products; and
   d) controlling distribution of the food products incoming on the input side to the product buffer or to the main flow as a function of the filling status of the product buffer.

5. The method in accordance with claim 1, further comprising:
   controlling product transfer from the product buffer to the plurality of parallel conveyor tracks as a function of the product supply detected on the input side in the individual conveyor tracks.

6. The method in accordance with claim 5, further comprising:
   selectively distributing the food products incoming on the input side to the product buffer or to a main flow of the food products, which main flow passes through to the output side.

7. The method in accordance with claim 6, further comprising:
   a) detecting the food products added to the product buffer;
   b) detecting the food products removed from the product buffer;
   c) determining a filling status of the product buffer from the added food products and from the removed food products; and
   d) controlling distribution of the food products incoming on the input side to the product buffer or to the main flow as a function of the filling status of the product buffer.

8. The method in accordance with claim 6, wherein the product buffer is supplied first.

9. The method in accordance with claim 8, further comprising:
   a) detecting the food products added to the product buffer;
   b) detecting the food products removed from the product buffer;
   c) determining a filling status of the product buffer from the added food products and from the removed food products; and
   d) controlling distribution of the food products incoming on the input side to the product buffer or to the main flow as a function of the filling status of the product buffer.

10. The method in accordance with claim 1, further comprising:
    controlling the product transfer between the plurality of parallel conveyor tracks as a function of the product supply detected on the input side in the individual conveyor tracks.

11. The method in accordance with claim 10, further comprising:
    selectively distributing the food products incoming on the input side to the product buffer or to a main flow of the food products, which main flow passes through to the output side.

12. The method in accordance with claim 11, further comprising:
    a) detecting the food products added to the product buffer;
    b) detecting the food products removed from the product buffer;
    c) determining a filling status of the product buffer from the added food products and from the removed food products; and
    d) controlling distribution of the food products incoming on the input side to the product buffer or to the main flow as a function of the filling status of the product buffer.

13. The method in accordance with claim 10, wherein the product buffer is supplied first.

14. The method in accordance with claim 13, further comprising:
    a) detecting the food products added to the product buffer;
    b) detecting the food products removed from the product buffer;
    c) determining a filling status of the product buffer from the added food products and from the removed food products; and
    d) controlling distribution of the food products incoming on the input side to the product buffer or to the main flow as a function of the filling status of the product buffer.

15. The method in accordance with claim 1, further comprising:
    selectively distributing the food products incoming on the input side to the product buffer or to a main flow of the food products, which main flow passes through to the output side.

16. The method in accordance with claim 15, further comprising:
    a) detecting the food products added to the product buffer;
    b) detecting the food products removed from the product buffer;

c) determining a filling status of the product buffer from the added food products and from the removed food products; and d) controlling distribution of the food products incoming on the input side to the product buffer or to the main flow as a function of the filling status of the product buffer.

17. The method in accordance with claim 15, wherein the product buffer is supplied first.

18. The method in accordance with claim 17, further comprising:

a) detecting the food products added to the product buffer;

b) detecting the food products removed from the product buffer;

c) determining a filling status of the product buffer from the added food products and from the removed food products; and d) controlling distribution of the food products incoming on the input side to the product buffer or to the main flow as a function of the filling status of the product buffer.

\* \* \* \* \*

UNITED STATES PATENT AND TRADEMARK OFFICE
CERTIFICATE OF CORRECTION

| | | |
|---|---|---|
| PATENT NO. | : 11,845,577 B2 | Page 1 of 1 |
| APPLICATION NO. | : 18/150271 | |
| DATED | : December 19, 2023 | |
| INVENTOR(S) | : Jürgen Bialy | |

It is certified that error appears in the above-identified patent and that said Letters Patent is hereby corrected as shown below:

On the Title Page

Insert Item -- (30) Foreign Application Priority Data
Feb. 24, 2014 (DE) ..................... 10 2014 002 530.6 --.

On Page 2, in Item (60), under "Related U.S. Application Data", Line 4, after "10,807,748", insert -- , which is a division of application No. 16/058,078, filed on Aug. 08, 2018, now Pat. No. 10,457,433, which is a continuation of application No. 14/628,434, filed on Feb. 23, 2015, now Pat. No. 10,065,757 --.

Signed and Sealed this
Twentieth Day of February, 2024

*Katherine Kelly Vidal*

Katherine Kelly Vidal
*Director of the United States Patent and Trademark Office*